United States Patent Office 3,538,114
Patented Nov. 3, 1970

3,538,114
N-(SUBSTITUTED-PHENYL)-SUCCINIMIDES
Walter Himmele, Walldorf, and Adolf Fischer, Mutterstadt, Pfalz, Germany, assignors to Badische Anilin- & Soda-Fabrik Aktiengesellschaft, Ludwigshafen (Rhine), Germany
No Drawing. Filed Aug. 2, 1967, Ser. No. 657,798
Claims priority, application Germany, Aug. 12, 1966, 1,542,835; June 21, 1967, 1,670,239
Int. Cl. C07d 27/10
U.S. Cl. 260—326.5      3 Claims

ABSTRACT OF THE DISCLOSURE

Substituted succinimides, in particular substituted phenyl succinimides, and a method of controlling unwanted plants with said succinimides.

---

The present invention relates to substituted succinimides, in particular N-phenyl-substituted succinimides, and a method of controlling unwanted plants with said compounds.

It is known that the salts of 2-methyl-4-chlorophenoxyacetic acid, propionic 3',4'-dichloroanilide and 2-chloro-4,6-bis(ethylamino)-s-triazine may be used for controlling unwanted plant growth. However, their action is not satisfactory.

An object of this invention is to provide new active compounds which have an excellent selective and total herbicidal action, i.e. unwanted plants are destroyed but crop plants are not injured and continue to grow normally. Another object of the invention is to provide a method of controlling unwanted plants.

These and other objects of the invention are achieved with substituted succinimides having the formula

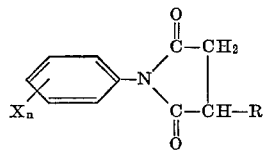

in which X denotes chlorine, bromine or a methyl, nitro, trifluoromethyl, methoxy, ethoxy or carboxy group, R denotes an aliphatic radical and n denotes 0, 1 or 2.

In order to prepare the new N-arylimides, the substituted succinic anhydride is placed for example in a flask and the aromatic amine is slowly added while stirring. It is advantageous to add a diluent, for example toluene, xylene or another hydrocarbon. The imide is formed by heating the mixture to above 140° C. To accelerate the formation of the imide, the water formed during the reaction is removed from the reaction vessel by means of entraining agents, i.e. the said hydrocarbons. When elimination of water is complete, the entraining agent is separated and the reaction mixture is allowed to cool until it can be diluted with methanol. The substituted phenyl succinimides are very readily crystallized in good purity from methanol.

The phenylimides of substituted succinic acid which bear a substituent on the phenyl nucleus may also be prepared by reacting the substituted arylamines direct with substituted succinic acid.

Preparation of N-(p-chlorophenyl)-allyl succinimide 280 parts (by weight) of allyl succinic anhydride (Chem. Ber. 76 (1943), page 27) are slowly mixed with 256 parts of p-chloroaniline while stirring, heat being evolved. Then 100 parts of toluene is added and water is eliminated at 170° to 180° C. with the aid of toluene as the entraining agent. In the course of eight hours a total of 33 parts of water is eliminated. The toluene is then distilled off and the residue is crystallized from 1,000 parts of methanol. 430 parts of N-(p-chlorophenyl)-allyl succinimide is obtained with a melting point of 108° C.

Preparation of N-(4-chloro-2-methylphenyl)-allyl succinimide 71 parts of 4-chloro-2-methylaminobenzene is mixed with 70 parts of allyl succinic anhydride. 20 parts of toluene is added in order to separate the reaction water and the reaction mixture is boiled under reflux at 180° C. until elimination of water is complete (10 hours). After the toluene has been separated, the residue is distilled in vacuo at 0.3 mm. Hg. At this pressure the N-(p-chloro-2-methylphenyl)-allyl succinimide distils at 172° to 175° C. 102 parts of the compound is obtained, which represents a yield of 78% of the theory. After being recrystallized from methanol the compound has a melting point of 62° C.

Preparation of p-bromophenylmethyl succinimide 130 parts of methyl succinic acid is mixed with 161 parts of p-bromoaniline in a flask provided with a still. 30 parts of toluene is added as an entraining agent for the water formed during the reaction and the mixture is heated at 180° C. The water is separated from the distillate and the toluene is returned to the flask. 33 parts of water is separated in the course of four hours. The reaction is then almost complete and no further water is formed.

After the toluene has been distilled off and the reaction mixture has cooled, the reaction product solidifies as crystals in the flask. The product is recrystallized from methanol and 185 parts of p-bromophenylmethyl succinimide with a melting point of 143° C. is obtained.

The following substances are examples of the new herbicidally active compounds:

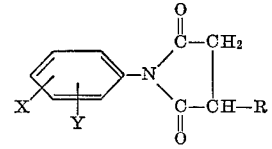

| R | X | Y | M.P., ° C. | B.P., ° C. |
|---|---|---|---|---|
| Allyl | m-NO₂ | | 97 | |
| Do | m-Cl | | 98 | |
| Do | p-Cl | m-Cl | 115 | |
| Do | m-CF₃ | | 129 | |
| Do | p-Br | | 121 | |
| Do | p-NO₂ | o-CH₃ | 94 | |
| Do | p-Cl | | 114 | |
| Do | p-Br | | 143 | |
| Do | m-CF₃ | | 121 | |
| Propyl | p-Br | | 110 | |
| Do | p-CH₃ | m-OCH₃ | 109 | |
| Crotyl | p-OCH₃ | | 93 | |
| Do | p-Cl | | 92 | |
| Methallyl | p-Br | | 127 | |
| Do | p-CH₃ | m-OCH₃ | 118 | |
| Do | p-OCH₃ | | | 175–180/0.2 mm. |
| Crotyl | p-Br | | 97 | |
| Iso-butyl | | | 111 | |
| Do | m-CH₃ | m-CH₃ | 68 | |
| n-Hexen-2-yl-1 | p-Cl | | 99 | |
| n-Octen-2-yl-1 | p-Cl | | 81 | |
| Do | | | | 184–187/0.3 mm. |
| n-Dodecen-2-yl-1 | | | | 213–217/0.2 mm. |
| 2-ethylhexen-2-yl-1 | m-OCH₃ | | | 178–181/0.1 mm. |
| 2-methylbuten-2-yl-1 | m-OCH₃ | p-CH₃ | 91 | |
| Do | p-Br | | 122 | |

The herbicidal agents according to this invention may be used as solutions, emulsions, suspensions or dusts. The form of application depends entirely on the purpose for which the agents are being used; in any case it should ensure a fine distribution of the active ingredient.

For the preparation of solutions to be sprayed direct, mineral oil fractions with medium to high boiling points such as kerosene or diesel oil, coal-tar oils and oils of vegetable and animal origin, cyclic hydrocarbons, such as tetrahydronaphthalene, and alkylated naphthalenes are suitable.

Aqueous formulations may be prepared from emulsion concentrates, pastes or wettable powders (spray powders) by adding water. To prepare emulsions the ingredients as such or dissolved in a solvent may be homogenized in water by means of wetting or dispersing agents. Concentrates which are suitable for dilution with water may be prepared from active ingredient, emulsifying or dispersing agent and possibly solvent. Compounds having adequate basicity may be used as salts in aqueous solution even after formation of the salt.

Dusts may be prepared by mixing or grinding the active ingredients with a solid carrier.

The compounds may be mixed with known herbicidally active agents, e.g. with substituted urea derivatives, triazine derivatives, carbamate derivatives, pyridazone derivatives and chlorinated fatty acid esters.

The following comparative experiments demonstrate the superiority of the compositions according to this invention over known active ingredients.

EXAMPLE 1

In a greenhouse plastic pots having a diameter of 8 cm. were filled with loamy sandy soil and seeds of Indian corn (*Zea mays*), cotton (*Gossypium sp.*), potatoes (*Solanum tuberosum*), rice (*Oryza sativa*), wild mustard (*Sinapis arvensis*), white goosefoot (*Chenopodium album*), small nettle (*Urtica urens*), vetch (*Vicia sp.*), chamomile (*Matricaria chamomilla*), annual meadow grass (*Poa annua*), slender foxtail (*Alopecurus myosuroides*) and barnyard grass (*Panicum crus galli*) were sown therein. The soil prepared in this way was then treated with N-(p-chlorophenyl)-allyl succinicide (I) and, for comparison, with the potassium salt of 2-methyl-4-chlorophenoxyacetic acid (II), each at a rate of 2 kg. of active ingredient per hectare dissolved in 500 liters of water. It could be observed after four to five weeks that I had a stronger herbicidal action and was better tolerated by Indian corn, cotton and rice than II. The herbicidal action can be seen from the following table.

|  | Active ingredient | |
|---|---|---|
|  | I | II |
| Crop plants: |  |  |
| Indian corn | 0–10 | 30–40 |
| Cotton | 0–10 | 40–50 |
| Potatoes | 10 | 10–20 |
| Rice | 10 | 30 |
| Unwanted plants: |  |  |
| Wild mustard | 90–100 | 90–100 |
| White goosefoot | 90–100 | 90–100 |
| Small nettle | 100 | 90–100 |
| Vetch | 90 | 70–80 |
| Chamomile | 80 | 60 |
| Annual meadow grass | 90–100 | 20 |
| Slender foxtail | 80 | 20–30 |
| Barnyard grass | 80 | 10–20 |

0=no injury.
100=complete kill.

EXAMPLE 2

In a greenhouse the plants barnyard grass (*Panicum crus galli*), wild oats (*Avena fatua*), annual meadow grass (*Poa anua*), slender foxtail (*Alopecurus myosuroides*), wild mustard (*Sinapis arvensis*), white goosefoot (*Chenopodium album*), small nettle (*Urtica urens*), chamomile (*Matricaria chamomilla*), vetch (*Vicia sp.*) and rice (*Oryza sativa*) were treated at a growth height of 4 to 20 cm. and the plants cotton (*Gossypium sp.*) and Indian corn (*Zea mays*) by the layby method with N-(p-chlorophenyl)-allyl succinimide (I) and, for comparison, with propionic 3′,4′-dichloroanilide (II), each at a rate of 2 kg. of active ingredient per hectare dispersed in 500 liters of water. It could be observed after two or three weeks that I had a stronger herbicidal action and was better tolerated by cotton and Indian corn than II. The herbicidal action can be seen from the following table.

|  | Active ingredient | |
|---|---|---|
|  | I | II |
| Crop plants: |  |  |
| Rice | 10 | 10 |
| Cotton | 10 | 30–40 |
| Indian corn | 10 | 20 |
| Unwanted plants: |  |  |
| Barnyard grass | 90–100 | 50–60 |
| Wild oats | 80–90 | 40 |
| Annual meadow grass | 90–100 | 60–70 |
| Slender foxtail | 90–100 | 60–70 |
| Wild mustard | 100 | 80 |
| White goosefoot | 90–100 | 60–70 |
| Small nettle | 100 | 60–70 |
| Chamomile | 90 | 60 |
| Vetch | 90–100 | 60 |

0=no injury.
100=complete kill.

EXAMPLE 3

An experimental plot which had been sown with barnyard grass (*Panicum crus galli*), wild oats (*Avena fatua*), annual meadow grass (*Poa annua*), slender foxtail (*Alopecurus myosuroides*), wild mustard (*Sinapis arvensis*), white goosefoot (*Chenopodium album*), small nettle (*Urtica urens*) and vetch (*Vicia sp.*) was sprayed on the day of sowing with N-(p-chlorophenyl)-allyl succinimide (I) and, for comparison, with 2-chloro-4,6-bis-(ethyl) amino-s-triazine (II), each at a rate of 5 kg. of active ingredient per hectare dispersed in 500 liters of water. It was observed after three to four weeks that active ingredient I had completely killed the broadleaved and grass weeds, whereas the weeds treated with active ingredient II were not completely withered.

EXAMPLE 4

An agricultural plot which was overgrown with barnyard grass (*Panicum crus galli*), white goosefoot (*Chenopodium album*), small nettle (*Urtica urens*), vetch (*Vicia sp.*), annual meadow grass (*Poa annua*) and slender foxtail (*Alopecurus myosuroides*) was sprayed at a growth height of the weeds of 3 to 8 cm. with N-(p-chlorophenyl)-allyl succinimide (I) and, for comparison, with 2-chloro-4,6-bis-(ethylamino)-s-triazine (II), each at a rate of 5 kg. of active ingredient per hectare dispersed in 500 liters of water. After eight days the broadleaved and grass weeds treated with I exhibited severe injury whereas the plants sprayed with II exhibited almost normal growth.

The following compounds have the same biological action as active ingredient I in Examples 1 to 4:

N-(p-bromophenyl)-allyl succinimide
N-(p-methoxyphenyl)-allyl succinimide
N-(p-methyl-m-methoxyphenyl)-allyl succinimide

EXAMPLE 5

In a greenhouse plastic pots with a diameter of 8 cm. were filled with loamy sandy soil and seeds of Indian corn (*Zea mays*), cotton (*Gossypium sp.*), potatoes (*Solanum tuberosum*), rice (*Oryza sativa*), wild mustard (*Sinapis arvensis*), white goosefoot (*Chenopodium album*), small nettle (*Urtica urens*), vetch (*Vicia sp.*), chamomile (*Matricaria chamomilla*), annual meadow grass (*Poa annua*) and barnyard grass (*Panicum crus galli*) were sown therein. The soil prepared in this way was then treated with N-(p-methoxyphenyl)-propyl succinimide (I), N-(p-chlorophenyl)-methyl succinimide (II) and N-(p-bromophenyl)-propyl succinimide (III), each at a rate of 4 kg. of active ingredient per hectare dispersed or dissolved in 500 liters of water. It could be observed that the wild mustard, white goosefoot, small nettle, vetch, chamomile, annual meadow grass and barnyard grass took considerably longer to germinate and emerge. After four to five weeks the weeds were almost completely withered. The crop plants Indian corn, potatoes, cotton and rice exhibited normal growth in the case of all the specified compounds.

The following compounds have the same biological action as active ingredients I, II and III:

N-(p-chlorophenyl)-propyl succinimide
N-(p-bromophenyl)-methyl succinimide
N-(p-ethoxyphenyl)-propyl succinimide

EXAMPLE 6

In a greenhouse the plants Indian corn (*Zea mays*), cotton (*Gossypium* sp.), potatoes (*Solanum tuberosum*), rice (*Oryza sativa*), wild mustard (*Sinapis arvensis*), white goosefoot (*Chenopodium album*), small nettle (*Urtica urens*), vetch (*Vicia* sp.), chamomile (*Matricaria chamomilla*), annual meadow grass (*Poa annua*) and barnyard grass (*Panicum crus galli*) were treated at a growth height of 3 to 20 cm. with N-(p-bromophenyl)-propyl succinimide (I) and N-(p-chlorophenyl)-methyl succinimide (II), each at a rate of 3 kg. of active ingredient per hectare dispersed in 500 liters of water.

The following results were observed after three weeks.

|  | Active ingredient | |
|---|---|---|
|  | I | II |
| Crop plants: | | |
| Indian corn | 10 | 0–10 |
| Cotton | 0–10 | 10 |
| Potatoes | 10 | 10 |
| Rice | 0–10 | 10 |
| Unwanted plants: | | |
| Wild mustard | 80 | 90 |
| White goosefoot | 80 | 90 |
| Small nettle | 80 | 90 |
| Vetch | 70 | 70–80 |
| Chamomile | 70 | 70–80 |
| Annual meadow grass | 90 | 80 |
| Barnyard grass | 90–100 | 90–100 |

0=no injury.
100=complete kill.

The following compounds have the same biological action as active ingredients I and II:

N-(p-chlorophenyl)-propyl succinimide
N-(p-bromophenyl)-methyl succinimide
N-(p-ethoxyphenyl)-propyl succinimide
N-(p-methoxyphenyl)-propyl succinimide
N-(m-trifluoromethylphenyl)-methyl succinimide
N-(p-methyl-m-methoxyphenyl)-propyl succinimide

We claim:
1. A substituted succinimide having the formula

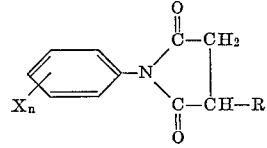

in which X denotes chlorine, bromine or a methyl, nitro, trifluoromethyl, methoxy, or ethoxy group, R denotes an allyl radical and $n$ denotes 0, 1 or 2.
2. N-(p-chlorophenyl)-allyl succinimide.
3. N-(p-bromophenyl)-allyl succinimide.

References Cited

UNITED STATES PATENTS 3,098,002  7/1963  Riddell et al. ___ 260—326.5 XR
3,138,523  6/1964  Schmeling _____ 260—326.5 XR

OTHER REFERENCES

Arcoria, Chem. Abs. 52: 7853a (1958).
Carriere, Chem. Abs. 16: 2476 (1922).
Dane et al., Chem. Abs. 52: 7152d (1958).
Hancock et al., Chem. Abs. 49: 2324 (1955).
Magee et al., Chem. Abs. 49: 3048 (1955).
Lacquin, Chem. Abs. 4: 581
Cookson et al., J. Chem. Soc., 1954: 4028–29.
Hogsed et al., J.A.C.S. 75 (4846–47), 1953.
Carroll et al., J. Org. Chem., 30: 33–35 (1965).

ALEX MAZEL, Primary Examiner

J. A. NARCAVAGE, Assistant Examiner

U.S. Cl. X.R.
71—95; 260—326.3

PO-1050
(5/69)

UNITED STATES PATENT OFFICE
CERTIFICATE OF CORRECTION

Patent No. 3,538,114  Dated November 3, 1970

Inventor(s) Walter Himmele et al

It is certified that error appears in the above-identified patent and that said Letters Patent are hereby corrected as shown below:

Column 2, line 55, in the table, seventh line of the table, "Do" should read -- Methyl --.

SIGNED AND SEALED

FEB 23 1971

(SEAL)
Attest:

Edward M. Fletcher, Jr.
Attesting Officer

WILLIAM E. SCHUYLER, JR.
Commissioner of Patents